US007962853B2

(12) United States Patent
Bedi et al.

(10) Patent No.: US 7,962,853 B2

(45) Date of Patent: Jun. 14, 2011

(54) METHOD AND SYSTEM FOR COLLABORATIVE EDITING OF A DOCUMENT

(75) Inventors: Bharat Veer Bedi, Portsmouth (GB); Marc Stanley Carter, Bournemouth (GB); Martin J. Gale, Hampshire (GB); Lucas William Partridge, Southampton (GB); Andrew James Stanford-Clark, Isle of Wight (GB)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 11/626,946

(22) Filed: Jan. 25, 2007

(65) Prior Publication Data

US 2007/0271502 A1 Nov. 22, 2007

(30) Foreign Application Priority Data

May 20, 2006 (GB) .................................. 0610116.6

(51) Int. Cl.
*G06F 17/00* (2006.01)
*G06F 15/16* (2006.01)

(52) U.S. Cl. ........ 715/751; 715/230; 715/234; 715/255; 709/206; 709/227

(58) Field of Classification Search .......... 715/200–202, 715/205, 226, 229–234, 253, 273, 760, 204, 715/209, 210, 212, 215, 221, 255, 256, 731, 715/751, 752, 753; 709/201, 203, 204, 206, 709/207, 216, 217, 219, 223, 227
See application file for complete search history.

(56) References Cited

U.S. PATENT DOCUMENTS

| | | | | |
|---|---|---|---|---|
| 5,790,847 | A | 8/1998 | Fisk et al. | |
| 6,243,722 | B1 | 6/2001 | Day et al. | |
| 6,438,564 | B1 * | 8/2002 | Morton et al. | 715/206 |
| 6,865,713 | B1 * | 3/2005 | Bates et al. | 715/233 |
| 6,999,962 | B2 * | 2/2006 | Julliard et al. | 707/999.01 |
| 7,552,383 | B2 * | 6/2009 | Morris et al. | 715/230 |
| 2003/0023679 | A1 | 1/2003 | Johnson et al. | |
| 2003/0060910 | A1 | 3/2003 | Williams et al. | |
| 2003/0097410 | A1 | 5/2003 | Atkins et al. | |

(Continued)

OTHER PUBLICATIONS

Shen et al., "Flexible Notification for Collaborative System", Nov. 16-20, 2002, pp. 77-86.*

(Continued)

*Primary Examiner* — Maikhanh Nguyen
(74) *Attorney, Agent, or Firm* — Schmeiser, Olsen & Watts; John Pivnichny

(57) ABSTRACT

A method and system for collaborative editing of a document by an author of the document and reviewers. Program code receives from the author an identification of selected portions of the document and receives from the author: comments created by the author and an identification of at least one reviewer to which each comment is directed. The selected portions and the comments are associated with each other on a one-to-one basis. Each comment pertains to content of the selected portion that each comment is associated with. The program code parses the received comments, and utilizes the identification of the at least one reviewer to which each comment is directed, to generate a list of comments specifying for each comment the at least one reviewer to which each comment is directed. The program code makes available to each reviewer the comments on the list of comments directed to each reviewer.

24 Claims, 22 Drawing Sheets

U.S. PATENT DOCUMENTS

| | | | | |
|---|---|---|---|---|
| 2003/0204490 | A1* | 10/2003 | Kasriel | 707/2 |
| 2004/0122843 | A1* | 6/2004 | Terris et al. | 707/102 |
| 2004/0205653 | A1 | 10/2004 | Hadfield et al. | |
| 2004/0267871 | A1 | 12/2004 | Pratley et al. | |
| 2005/0004986 | A1 | 1/2005 | Aoki et al. | |
| 2005/0021624 | A1* | 1/2005 | Herf et al. | 709/204 |
| 2005/0033811 | A1 | 2/2005 | Bhogal et al. | |
| 2006/0053194 | A1 | 3/2006 | Schneider et al. | |
| 2006/0053365 | A1 | 3/2006 | Hollander et al. | |
| 2006/0053380 | A1 | 3/2006 | Spataro et al. | |
| 2006/0282762 | A1* | 12/2006 | Diamond et al. | 715/511 |
| 2007/0118598 | A1 | 5/2007 | Bedi et al. | |
| 2007/0118794 | A1* | 5/2007 | Hollander et al. | 715/512 |

OTHER PUBLICATIONS

A. Zafer, "NetEdit: A Collaborative Editor", Apr. 23, 2001, pp. 1-89.*

Perry, et al.; "Collaborative Editing within the Pervasive Collaborative Computing Environment", The 5th International Workshop on Collaborative Editing, ECSCW 2003, Helsinki,Finland, Sep. 15, 2003. 6 pages.

MS Office 2000 Server Extension. [online]. 12 pages. [retrieved on Oct. 6, 2006]. Retrieved from the Internet: < URL: http://www.grape-info.com/doc/win2000srv/ose/>.

Xhost—Office Server Extensions FAQ. [online]. 2 pages. [retrieved on Oct. 6, 2006]. Retrieved from the Internet: < URL: http://www.xhost.co.uk/faqs/msofficefax.htm>.

Microsoft Office Assistance: Using Office Server Extensions on Windows NT or Windows 2000. [online]. 5 pages. [retrieved on Oct. 6, 2006]. Retrieved from the Internet: < URL: http://www.office.microsoft.com/en-us/assistance/HA011382721033.aspx>.

Shen, et al.; Flexible Notification for Collaborative Systems; CSCW'02, Nov. 16-20, 2002, New Orleans, Louisiana, USA; pp. 77-86.

Mc Loughlin, Mark; Remote Desktop Project (Work in Progress); Dec. 1, 2003. [online]. 19 pages. [retrieved on Oct. 6, 2006]. Retrieved from the Internet: < URL: http://www.gnome.org/~markmc/remote-desktop.txt; 19 pages.

RealVNC—VNC—How it works. [online]. 3 pages. [retrieved on Oct. 6, 2006]. Retrieved from the Internet: < URL: http://www.realvnc.com/howitworks.html>.

Conferral Support; More Resources. [online] 2 pages. [retrieved on Jan. 11, 2005]. Retrieved from the Internet: < URL: http://www.conferral.com/s-more-resources-recipient-faqs.html>.

Conferral review by PC Magazine.PCMAG.COM The Independent Guide to Technology. [online]. 8 pages. [retrieved on Oct. 9, 2006]. Retrieved from the Internet: < URL: http://www.pcmag.com/article2/0,1895,1853919.asp>.

Spontaneous Web Conferencing and Collaboration—It's About Time. Conferral. [online]. 4 pages. [retrieved on May 18, 2005]. Retrieved from the internet: < URL: http://www.conferral.com/news/pdf>.

MoonEdit PRO—coming soon! [online]. 1 page. [retrieved on Oct. 6, 2006]. Retrieved from the Internet:< URL: http://www.moonedit.com>.

Please Review—Overview; Please Review collaborative document review and authoring. [online]. 2 pages. [retrieved on Oct. 9, 2006]. Retrieved from the Internet: < URL: http://www.pleasereview.com/overview.html>.

Lockwood, Brett; "Working with Comments in Word" Manipulating the Comment Reference Mark Labels: Part 1; PC Update Online! The magazine of the Melbourne PC User Group. [online]. 7 pages. [retrieved on Oct. 9, 2006]. Retrieved from the Internet:< URL: http://www.melbpc.org.au/pcupdate/2305/2305article9.htm>.

Office Action (Mail Date Jul. 21, 2009) for U.S. Appl. No. 11/598,909, Filing Date Nov. 14, 2006; Confirmation No. 1631.

Amendment filed Dec. 7, 2009 in response to Office Action (Mail Date Jul. 21, 2009) for U.S. Appl. No. 11/598,909, Filing Date Nov. 14, 2006; Confirmation No. 1631.

Final Office Action (Mail Date Dec. 30, 2009) for U.S. Appl. No. 11/598,909, Filing Date Nov. 14, 2006; Confirmation No. 1631.

RCE and Amendment filed Feb. 16, 2010 in response to the Final Office Action (Mail Date Dec. 30, 2009) for U.S. Appl. No. 11/598,909, Filing Date Nov. 14, 2006; Confirmation No. 1631.

Final Office Action (Mail Date Apr. 1, 2010) for U.S. Appl. No. 11/598,909, Filing Date Nov. 14, 2006; Confirmation No. 1631.

RCE and Amendment filed Jun. 10, 2010 in response to Final Office Action (Mail Date Apr. 1, 2010) for U.S. Appl. No. 11/598,909, Filing date Nov. 14, 2006; Confirmation No. 1631.

Office Action (Mail Date Jul. 15, 2010) for Patent Application U.S. Appl. No. 11/598,909, Filing Date Nov. 14, 2006; Confirmation No. 1631.

Amendment filed Oct. 15, 2010 in response to Office Action (Mail Date Jul. 15, 2010) for U.S. Appl. No. 11/598,909, Filing Date Nov. 14, 2006; Confirmation No. 1631.

Final Office Action (Mail Date Nov. 12, 2010) for U.S. Appl. No. 11/598,909, Filing Date Nov. 14, 2006; Confirmation No. 1631.

* cited by examiner

ADDRESSED TO:

| COMMENT | BOB | CHRIS |
|---|---|---|
| 1 | × | ✓ |
| 2 | ✓ | ✓ |
| 3 | ✓ | × |
| 4 | ✓ | ✓ |
| 5 | ✓ | × |

| To: | Bob |
| From: | Collaborative Document Editor on behalf of Alan |
| Subject: | Your input is required on Document 10 |

This is an autogenerated message on behalf of Alan.

Alan has just edited Document 10 <link to doc>

1) <selected text of comment 2>
   comment 2 <link>
2) <selected text of comment 3>
   comment 3 <link>
3) <selected text of comment 4>
   comment 4 <link>
4) <selected text of comment 5>
   comment 5 <link>

95

To: Chris
From: Collaborative Document Editor
on behalf of Alan
Subject: Your input is required
on Document 10

This is an autogenerated message on behalf of Alan.

Alan has just edited Document 10 <link to doc>

1) <selected text of comment 1>
   comment 1 <link>
2) <selected text of comment 2>
   comment 2 <link>
3) <selected text of comment 4>
   comment 4 <link>

*FIG. 5b*

To: Alan
From: Collaborative Document Editor on behalf of Bob
Subject: Your input is required on Document 10

This is an autogenerated message on behalf of Bob

Bob has just edited Document 10 <link to doc>

Responses to your comments:
1) <selected text of comment 2>
response text

New Comments:
1) <selected text of comment x>
comment x

*FIG. 6d*

STEP 1

```
<comment id="14326964852">
<originator name="Alan" notify="false" actionPending="false"/>
<selectedText>
        The History of Pizza Making
</selectedText>
<commentText>
    <text author="Alan">
        Hi Bob/Chris
        Is this the right title?
        Alan
    </text>
</commentText>
<targetCoauthor name="Bob" notify="true" actionPending="true"/>
<targetCoauthor name="Chris" notify="true" actionPending="true"/>
</comment>
```

*FIG. 7a*

STEP 2

```
<comment id="14326964852">
<originator name="Alan" notify="false" actionPending="false"/>
<selectedText>
            The History of Pizza Making
</selectedText>
<commentText>
      <text author="Alan">
            Hi Bob/Chris
            Is this the right title?
            Alan
      </text>
</commentText>
<targetCoauthor name="Bob" notify= "false" actionPending="true"/>
<targetCoauthor name="Chris" notify="false" actionPending="true"/>
</comment>
```

*FIG. 7b*

STEP 3

```
<comment id="14326964852">
<originator name="Alan" notify= "true" actionPending="true"/>
<selectedText>
            The Complete History of Pizza Making
</selectedText>
<commentText>
      <text author=Alan>
            Hi Bob/Chris
            Is this the right title?
            Alan
      </text>
</commentText>
<targetCoauthor name="Bob" notify= "false" actionPending="false">
<response>
      No - you forgot the "complete"
</response>
</targetCoauthor>
<targetCoauthor name="Chris" notify="false" actionPending="true"/>
</comment>
```

*FIG. 7c*

STEP 4

<comment id="14326964852">
<originator name="Alan" notify= "false" actionPending="true"/>
<selectedText>
The Complete History of Pizza Making
</selectedText>
<commentText>
<text author="Alan">
Hi Bob/Chris
Is this the right title?
Alan
</text>
<text author="Bob">
No - you forgot the "complete"
</text>
</commentText>
<targetCoauthor name="Bob" notify="false" actionPending="false">
<targetCoauthor name="Chris" notify="false" actionPending="true"/>
</comment>

*FIG. 7d*

STEP 5

```
<comment id="14326964852">
<originator name="Alan" method="email" notify="false" actionPending= "false" />
<selectedText>
        The Complete History of Pizza Making
</selectedText>
<commentText>
    <text author="Alan">
        Hi Bob/Chris
        Is this the right title?
        Alan
    </text>
    <text author="Bob">
        No - you forgot the "complete".
    </text>
</commentText>
<targetCoauthor name="Bob" notify="false" actionPending="false">
<targetCoauthor name="Chris" notify="false" actionPending="true"/>
</comment>
```

*FIG. 7e*

METHOD AND SYSTEM FOR COLLABORATIVE EDITING OF A DOCUMENT

FIELD OF THE INVENTION

The invention relates to a method and system for collaborative document editing.

BACKGROUND OF THE INVENTION

When collaboratively editing a document, it is typical for an author to make various updates. In addition to incorporating updates into a document, a document editor may wish to comment on selected portions of the document.

Current systems for commenting on a collaboratively edited document are somewhat unsophisticated.

SUMMARY OF THE INVENTION

The present invention provides method and associated system for collaborative editing of a document by an author of the document and a plurality of reviewers, said method being performed by program code executing on a computer, said method comprising:

receiving, by the program code from the author, an identification of a plurality of selected portions of the document;

receiving, by the program code from the author, a plurality of comments created by the author and an identification of at least one reviewer of the plurality of reviewers to which each received comment is directed, wherein the selected portions and the comments are associated with each other on a one-to-one basis, and wherein each comment pertains to content of the selected portion that each comment is associated with;

parsing the received comments, and utilizing the received identification of the at least one reviewer to which each comment is directed, to generate a list of comments comprising the plurality of comments, wherein the list of comments specifies for each comment the at least one reviewer to which each comment is directed, and wherein said parsing and said utilizing are performed by the program code; and making available, by the program code to each reviewer, the list of comments directed to each reviewer.

The present invention provides a method and system for collaboratively editing a document that is more sophisticated than currently exists.

BRIEF DESCRIPTION OF THE DRAWINGS

FIG. 4*b* illustrates to whom various comments are addressed, in accordance with embodiments of the present invention.

FIGS. 5*a* and 5*b* provide exemplary comment notifications, in accordance with embodiments of the present invention.

FIG. 6*d* depicts a response notification received by a comment originator, in accordance with embodiments of the present invention.

FIGS. 7*a* to 7*e* illustrate markup generated for a comment, in accordance with embodiments of the present invention.

DETAILED DESCRIPTION OF THE INVENTION

Figure 1:
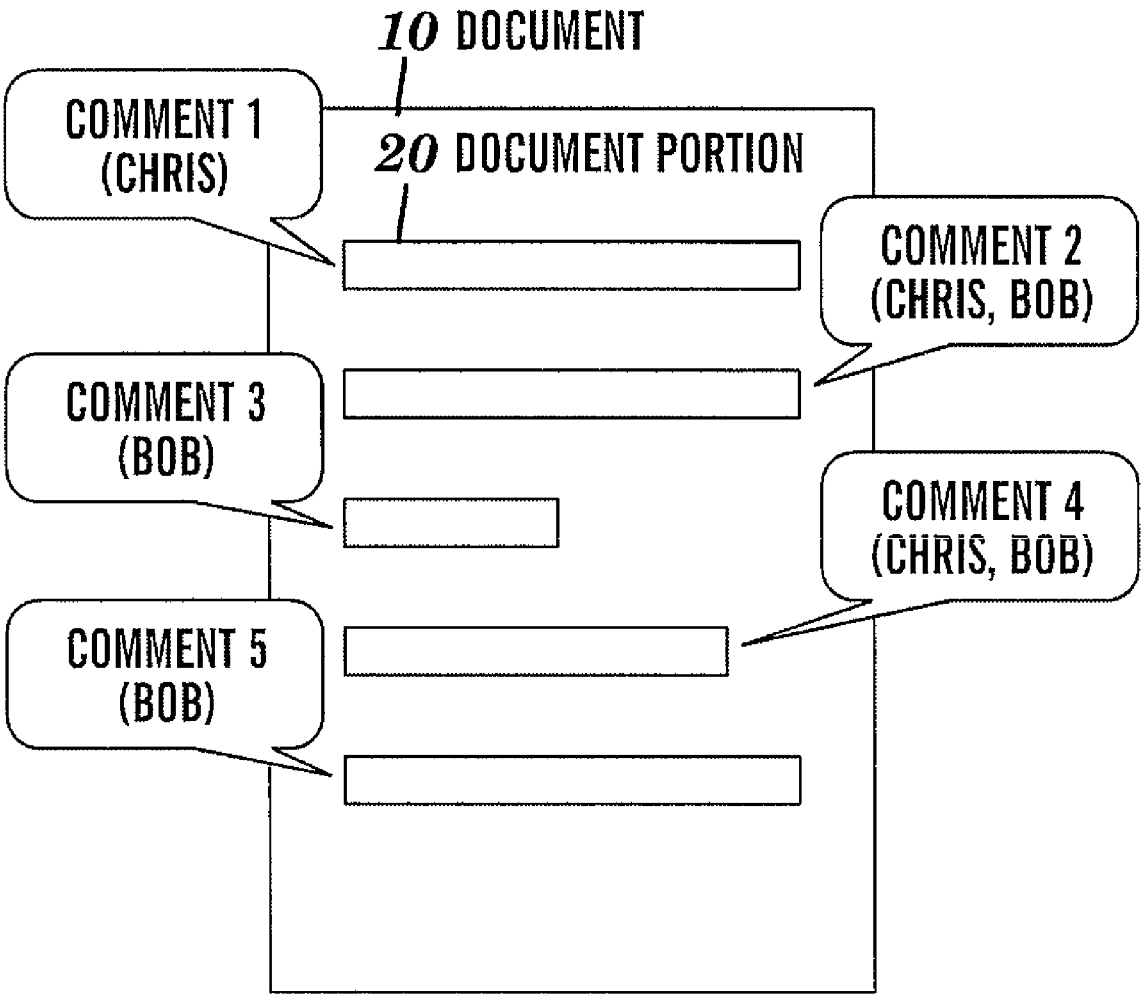
FIG. 1 shows a document having various comments associated therewith, in accordance with embodiments of the present invention.

According to a first aspect, the invention provides a method for collaborative editing of a document, the method comprising: generating a plurality of annotations, each annotation being associated with a portion of the document and being designated as applicable to one or more reviewers; parsing the annotations to compile a list of annotations applicable to a reviewer; and presenting the reviewer with the annotations applicable to the reviewer.

Annotations may comprise updates to the document or they may comprise actual comments on portions of the document. Central to the invention is the possibility of targeting updates to different reviewers and to either provide a reviewer with a list of annotations relevant to the reviewer at the head of the document being edited or to notify a reviewer of their annotations.

Presenting a reviewer with a list of annotations applicable to the reviewer may involve providing the annotations to a separate notification (e.g. email application) program with information on what to notify.

In one embodiment, the annotations are stored as part of the document and the document is parsed to compile a list of annotations applicable to the reviewer. In another embodiment, the annotations (e.g. comments) may be stored separately from the actual document.

In one embodiment, it can be determined which reviewer is currently looking at the document in order to present the reviewer with a list of annotations applicable to the reviewer.

In one embodiment, presenting the reviewer with applicable annotations involves notifying the reviewer that the annotations are available. The reviewer may be provided a notification including a link to the document associated with the annotations. Alternatively, the reviewer may be provided with a notification including the annotations applicable to the reviewer and a link to each document portion associated with an annotation.

In one embodiment, notification of annotations applicable to a particular reviewer is received and the document with which the annotations are associated is linked to.

In one embodiment, linking comprises linking to a document portion associated with an annotation.

In one embodiment, once the document has been linked to, the reviewer is presented with a list of annotations applicable to the reviewer. It is then possible to link to an annotation presented in the list.

In one embodiment, a response to an annotation associated with a document portion is received and the originator of the annotation is notified of the response.

The status of an annotation may be updated. This can indicate, for example, whether there is an action pending from any reviewer/the originator etc. It can also indicate the overall status of the annotation.

Historical information may be provided for each annotation (e.g. a comments history/previous updates etc.).

According to another aspect, there is provided an apparatus for collaborative editing of a document, the apparatus comprising: means for generating a plurality of annotations, each annotation being associated with a portion of the document and being designated as applicable to one or more reviewers; means for parsing the annotations to compile a list of annotations applicable to a reviewer; and means for presenting the reviewer with the annotations applicable to the reviewer.

According to another aspect, there is provided a computer program for collaborative editing of a document. The computer program comprises program code, stored or embedded in a computer-readable memory unit and adapted to perform the method steps of the present invention when said program is run (i.e, executed) on a computer of a computer system (i.e., the program code is executed on a processor of the computer).

A system is disclosed for collaboratively editing a document. The system provided enables the co-authors of a document to comment on selected portions of the document and to address their comments to other co-authors.

FIG. 1 shows a document 10 having various comments associated therewith, in accordance with embodiments of the present invention. FIG. 1 illustrates how an originator of document 10 can select (e.g., highlight) certain document portions 20 and associate one or more comments with each selected document portion. Comments 1 to 5 are shown on the diagram and each comment indicates to whom each comment is addressed. When the document is created, the creator specifies a list of co-authors and comment addressees can be selected from this list.

Figure 2:
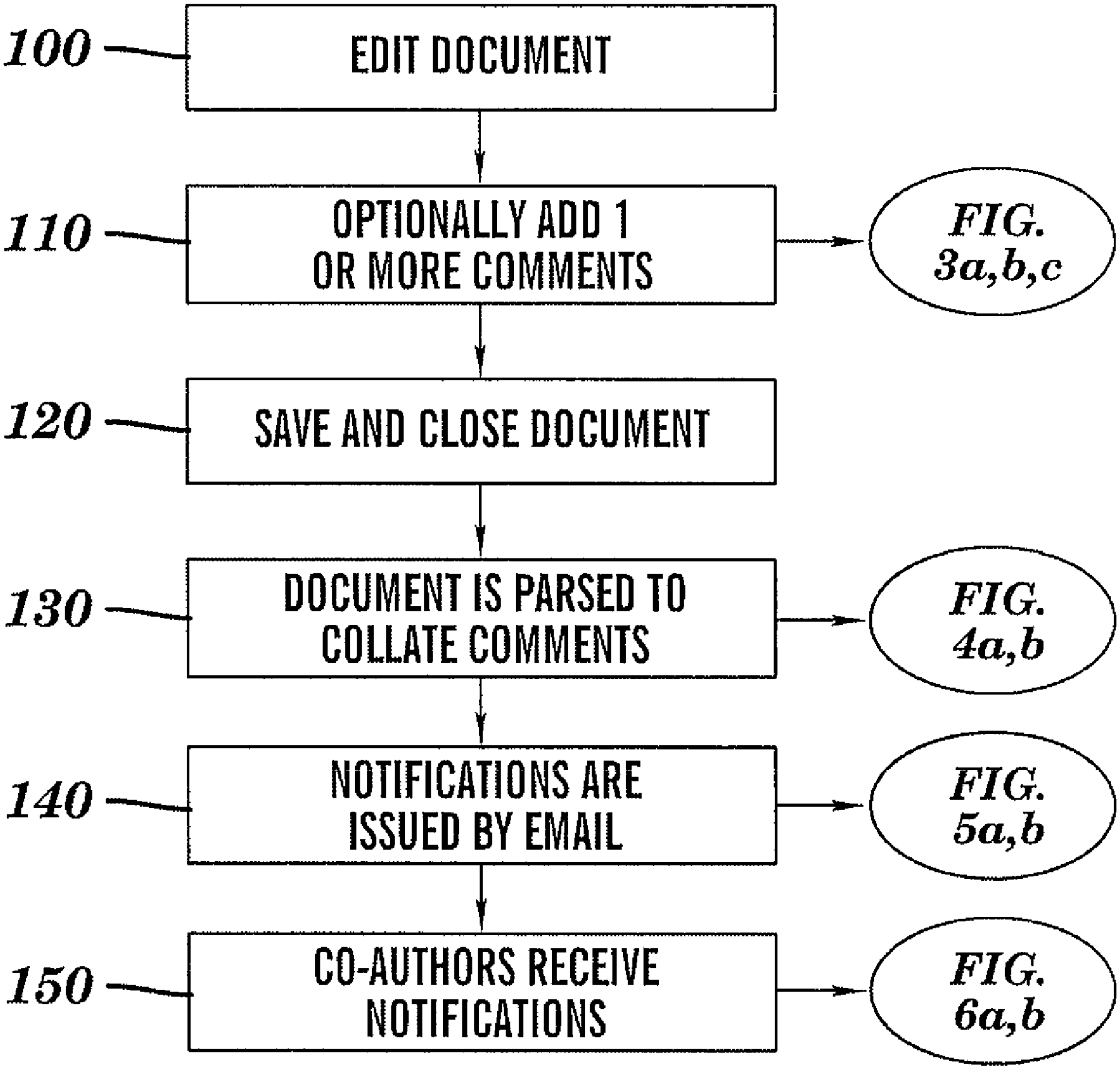
FIG. 2 is a flow chart describing the processing of a document, in accordance with embodiments of the present invention.

FIG. 2 is a flow chart describing the processing of a document, in accordance with embodiments of the present invention. The componentry used to achieve the processing disclosed by this and other flowchart figures is illustrated using FIGS. 8*a* and 8*b*. These figures will be referenced throughout.

Figure 3A:
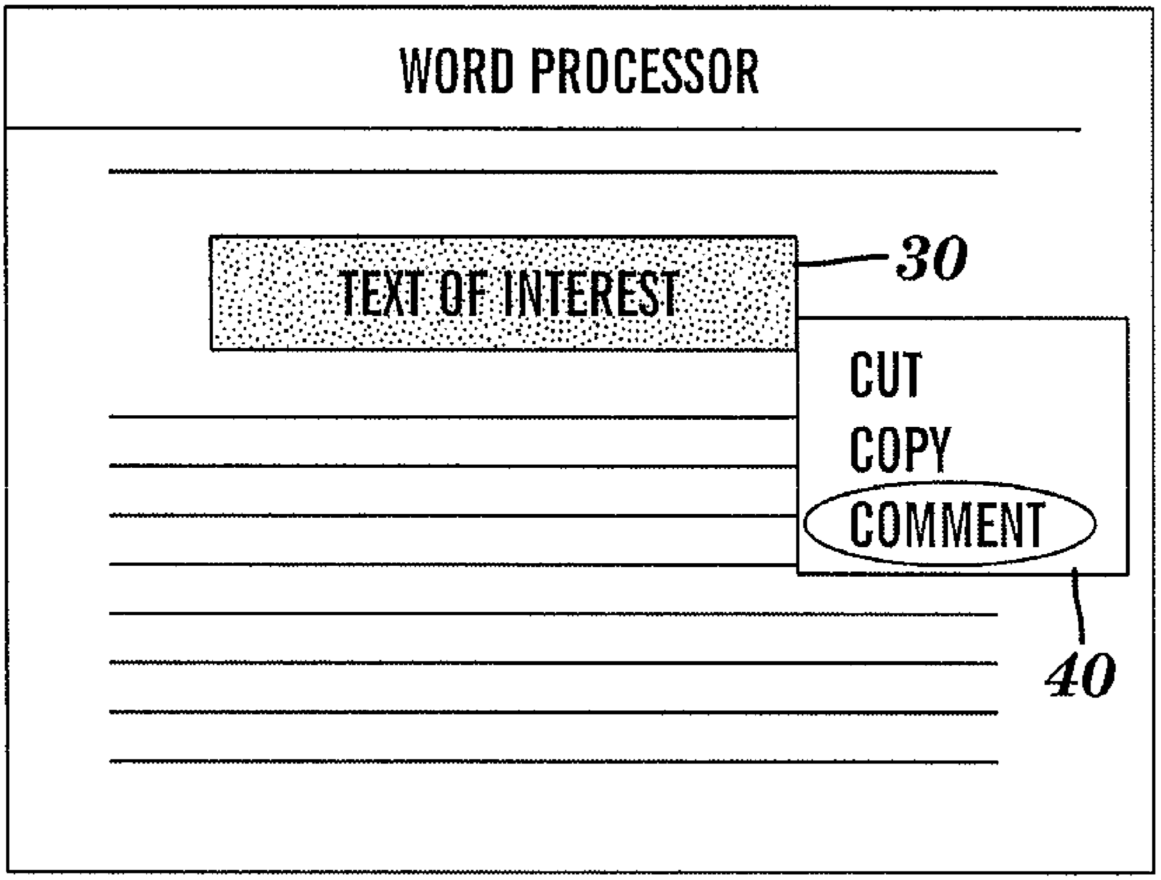
FIGS. 3*a* and 3*b* show a screen shot of a GUI for commenting on selected portions of a document, in accordance with embodiments of the present invention.

The originating author (Alan) edits document 10 (step 100) using editor 810. At step 110, one or more comments are added to the document via commenter 840. As shown in FIG. 3*a*, this is achieved by highlighting text of interest (Text Highlighter 875) and then right clicking with the mouse. This brings up a menu 40 from which the author can select the "Comment" option to create a comment using Comment Creator 890.

Figure 3B:
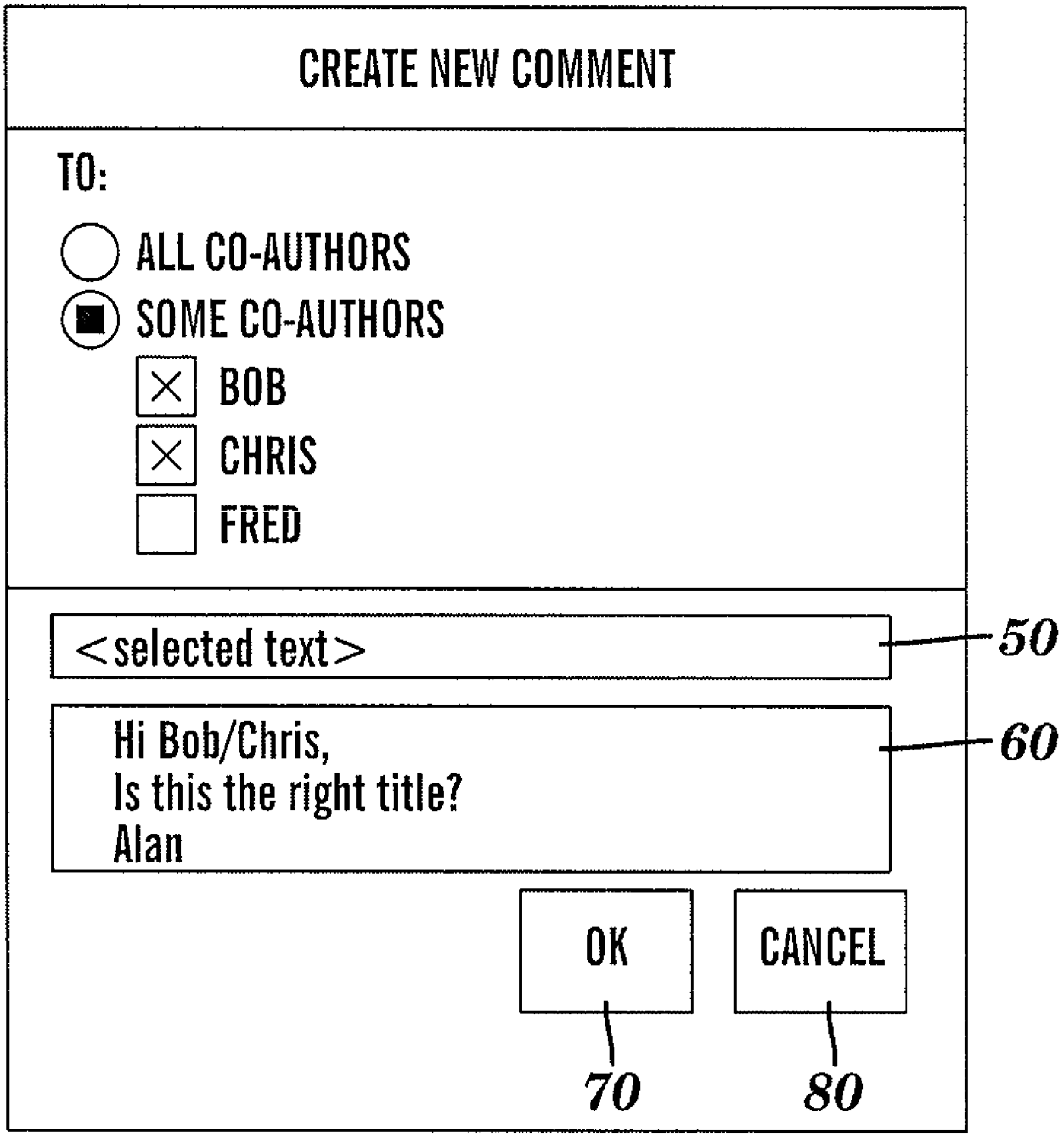

FIG. 3*b* illustrates the displayed form that is generated in response to such a "Comment" selection. Such a display is provided by Comment Creator 890. The author is given the option elsewhere within the document editor's configuration settings of communicating with other co-authors (i.e., reviewers) by a predefined mechanism such as email. The author is then given the option of addressing the comment to: All co-authors; or Some Co-authors. The text with which the comment is to be associated is extracted from the document and displayed in field 50. Field 50 may display scrollbars if the entirety of the selected text is not visible within the field. An input box 60 is also provided for the associated comment. When the originating author has finished, confirmation of the comment is provided by selecting OK button 70. Otherwise, the comment can be undone via Cancel button 80. In the latter case the dialogue box disappears but the text still remains selected.

In this way, the originating author adds comments to selected portions of the document.

Figure 3C:
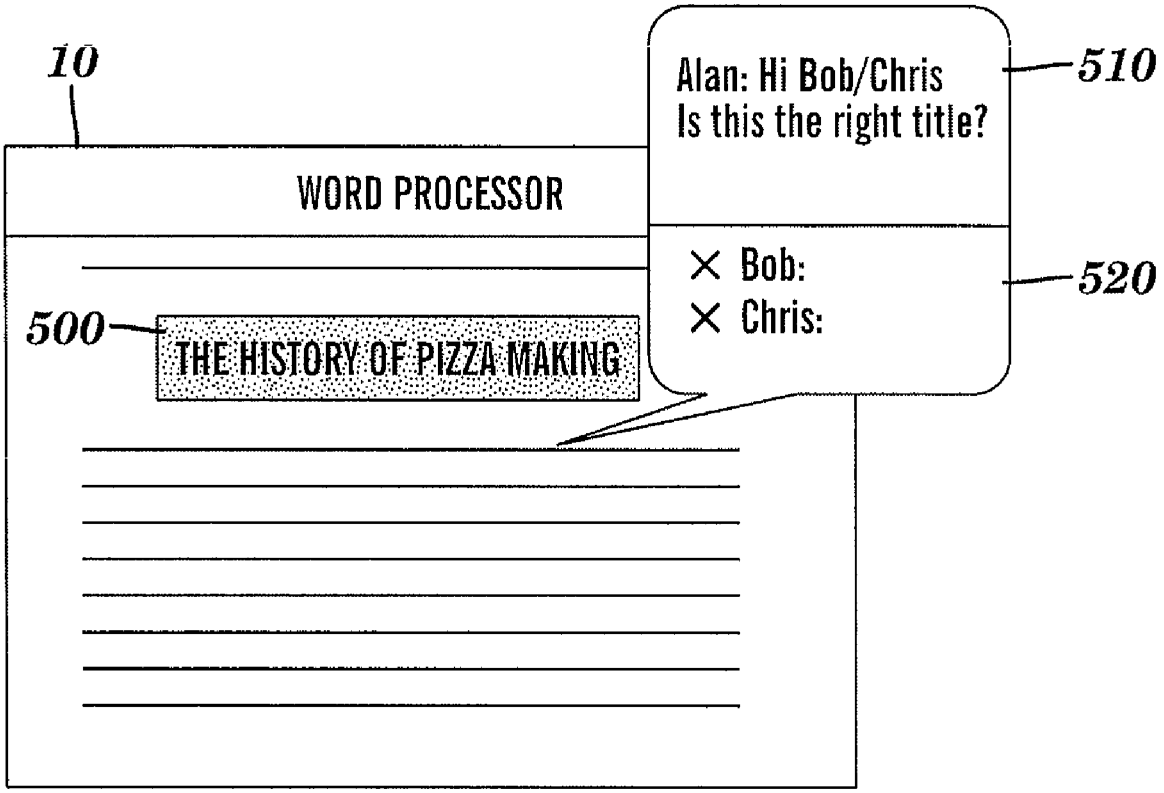
FIG. 3*c* provides an exemplary screenshot, of the present invention in accordance with embodiments of the present invention.

After a comment has been created by Alan using the dialogue box of FIG. 3*b*, the document looks as shown in FIG. 3*c*. Comment 510 shows that Alan has asked a question to both Bob and Chris and that neither of them has yet replied.

When the originating author is done, the document is saved and closed (step 120 of FIG. 2) using Save Component 820. The document is then parsed to collate the comments addressed to each co-author (step 130).

Figure 4A:
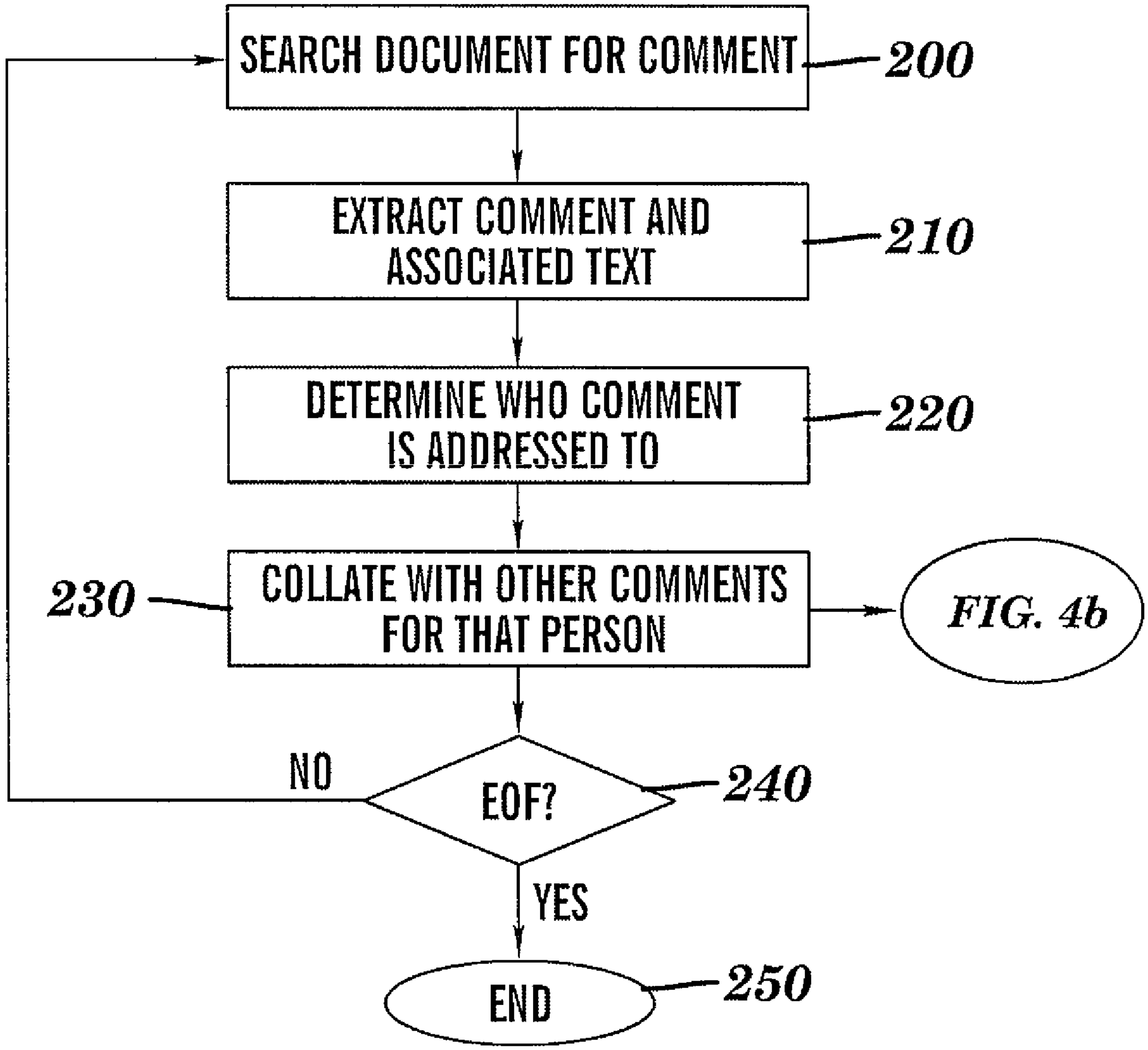
FIG. 4*a* illustrates the processing performed by a parser component, in accordance with embodiments of the present invention.
Figure 4B:
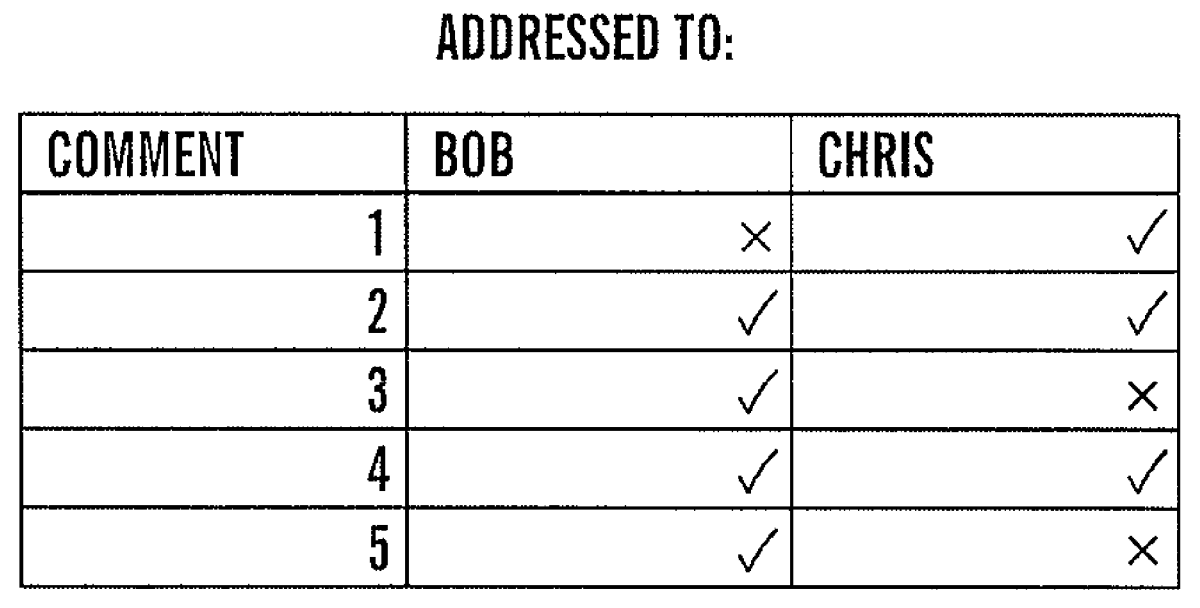

The parsing and collation process is disclosed with reference to FIGS. 4*a* and 4*b*. At step 200 a Parsing component 830 searches the document for a comment (Searcher 900). When found, a comment is extracted (step 210) using Extractor 910 and it is determined (Determiner 920) to whom the comment is addressed (step 220). The extracted comment is then collated (Collater 940) with other comments for the same person. FIG. 4*b* indicates that in this example, comments 1, 2 and 4 are addressed to Chris, while comments 2, 3, 4 and 5 are addressed to Bob. The parsing and collation process continues until the end of the file (EOF) is reached (step 240). This is determined using EOF Locator 930. At this point the process ends (step 250).

Having parsed the document to collate comments, notifications are automatically issued (using Notifier 850) by email to appropriate co-authors (step 140 of FIG. 2).

Co-authors are notified when there is some new information in a comment targeted at them. The means for achieving this will be described later with reference to FIGS. 7*a* to 7*e*.

Figure 5A:
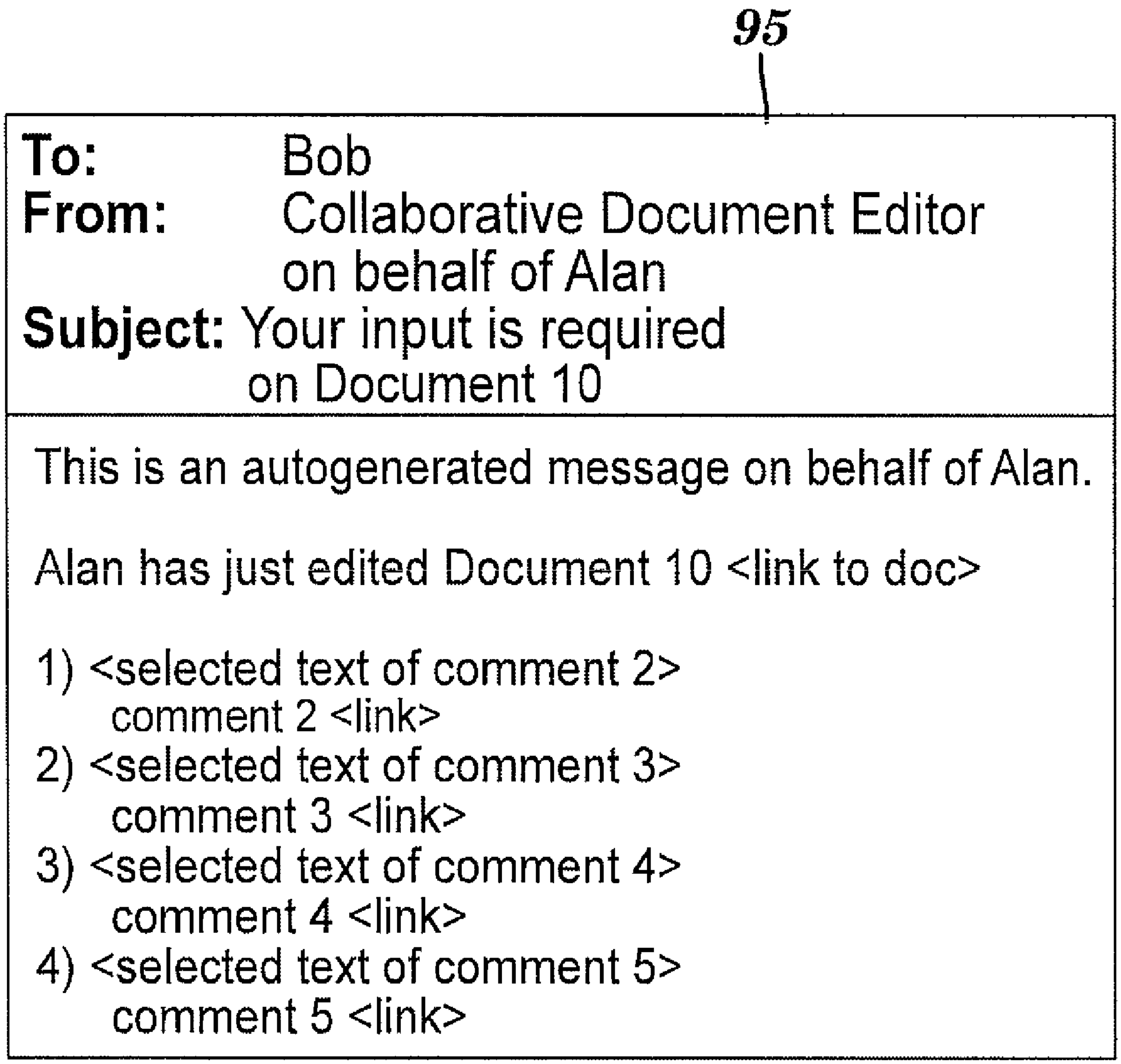

Exemplary notifications are provided with reference to FIGS. 5*a* and 5*b*. FIG. 5*a* shows a notification provided by Alan to Bob. Email 95 indicates that Bob's input is required for document 10 and that this is an autogenerated message on behalf of Alan. This is possible because each time a comment is created, the originator identifier (ID) (i.e., author ID) is included with the comment, as are the names of the co-authors to whom the comment is addressed. This information is used by Notifier component 850 to fill in the details for email 95. This is discussed in more detail with reference to FIGS. 7*a* to 7*e*, the markup for which is generated by markup generator 880. The email 95 includes a document link to Document 10 and also provides a list of selected text portions (extracted at step 210 of FIG. 4*a*) and each text portion's associated comment. A link directly to each comment is also provided. It will of course be appreciated that this is by way of example only and the invention is not limited to textual documents. For instance, the same technique could be applied to spreadsheets, presentations, diagrams, etc.

FIG. 5*b* shows the email notification provided by Alan to Chris and is of the same format as in FIG. 5*a*.

Figure 6A:
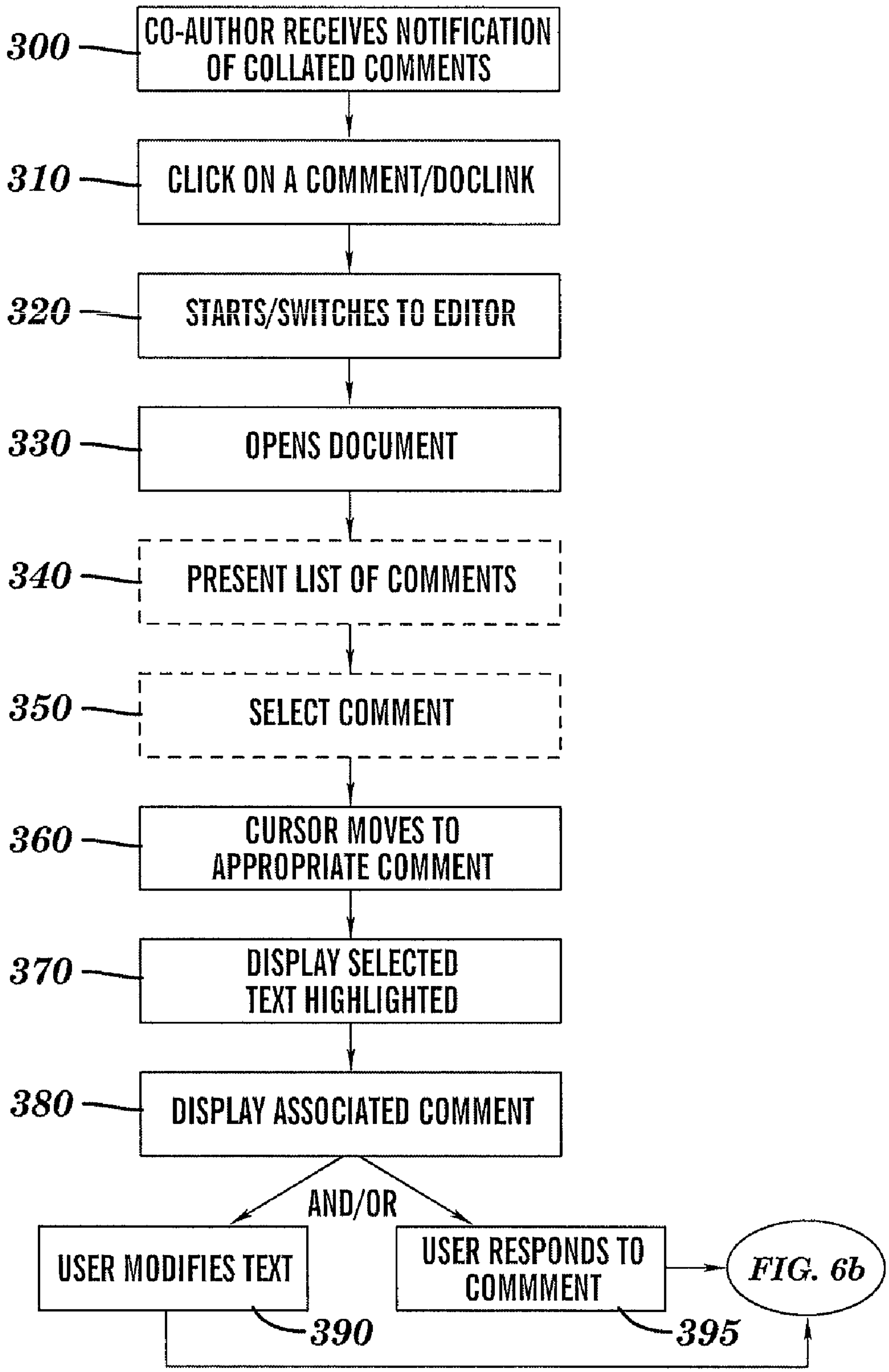
FIGS. 6*a*, 6*b* and 6*c* illustrate the processing following the receipt of a notification by a co-author, in accordance with embodiments of the present invention.

Each email is sent by known mechanisms to appropriate co-authors who receive them at step 150 of FIG. 2. The processing from each co-author's point of view is disclosed with reference to FIGS. 6*a* and 6*b*.

A co-author receives a notification such as the ones shown in FIGS. 5*a* and 5*b* at step 300 (Notification Receiver 1000). Each co-author can then either click on a document link (which will take the co-author to the beginning of document 10) or the co-author can click on a specific comment (which will link the co-author to the specific part of the document with which the comment is associated (step 310)). Either approach uses Linker component 1050. Clicking on a comment or a document link causes an appropriate editor to be loaded or switched to (step 320) using Editor Loader/

Switcher 1010. The relevant document is then loaded at step 330 using Document Loader 1060. Document Loader component 1060 uses the document name referenced in the notification to determine which document to load. This is possible because the link will refer to the full path of the document, including its location on a shared server. However, just as the comment markup language is not displayed, only the name of the document appears in the email; but as a clickable link. Steps 340 and 350 in FIG. 6*a* indicate additional processing that occurs if the user simply clicked on the main document link.

At step 340, users are presented with a list of comments for which they have an action pending. The data pertaining to this is preferably achieved in STEPs 3 and 4 described later and displayed using Comment Displayer 860. The co-author is able to select a comment at step 350. (Note, the user does not necessarily have to click on a document link but could just open the document normally.)

Figure 9A:
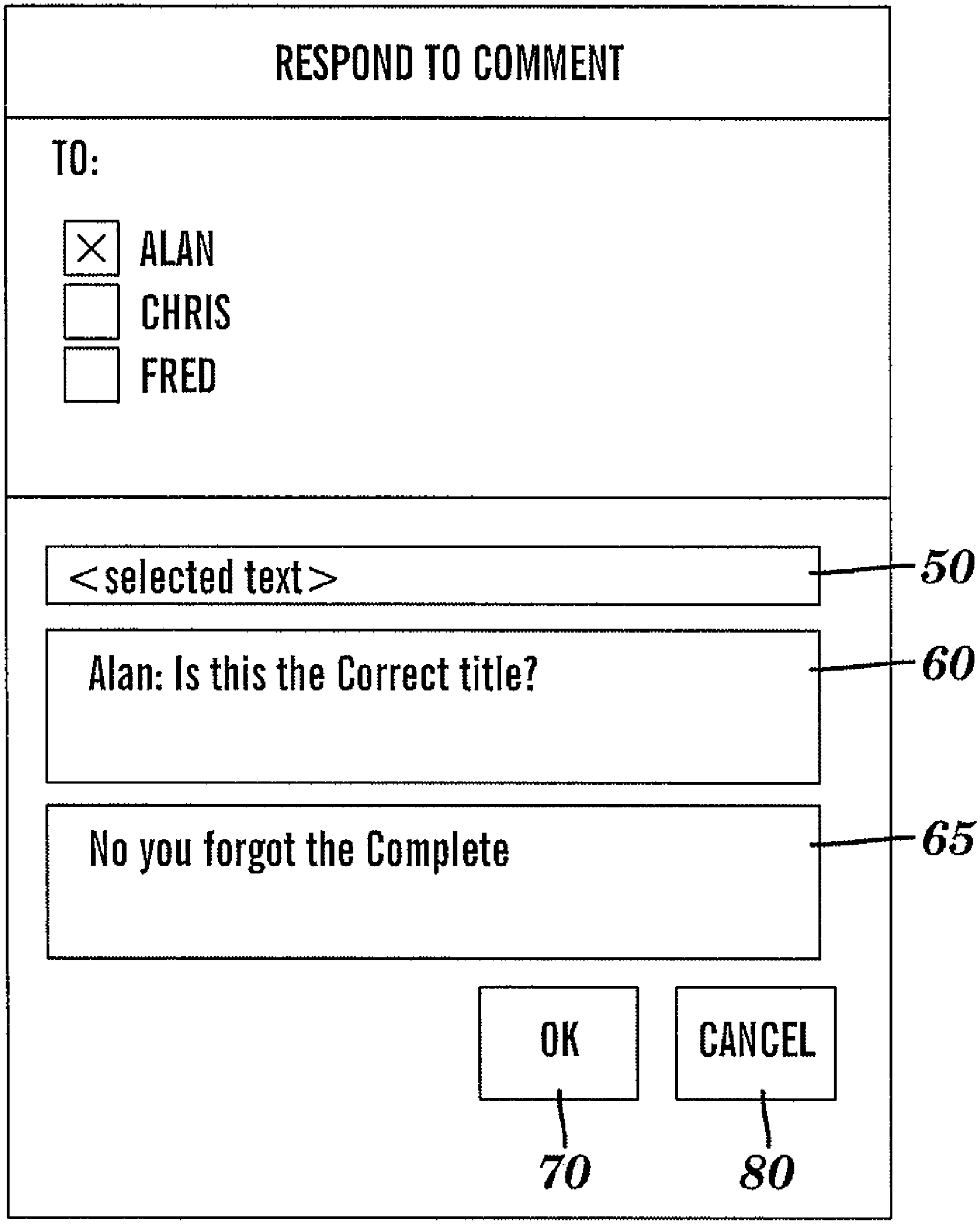
FIG. 9*a* shows a dialogue box for responding to comments in accordance with embodiments of the present invention.

Irrespective of whether a document link or a particular comment was selected at step 310, the process continues with step 360. At step 360 the document cursor is moved to the appropriate comment within the body of the text. The associated text is displayed highlighted (step 370), as is the associated comment (step 380). Again this processing is achieved by means of Comment Displayer 860 and text highlighter 875. At this point the co-author (user) can modify the highlighted text (step 390). In one embodiment, such modifications may be indicated in a different color. The user can choose at step 395 to respond to the comments. Such processing is achieved using Input Receiver 1040 which presents the user with a dialogue box when the user clicks upon a comment 510. Such a dialogue box is shown in FIG. 9*a* and is similar to that shown in FIG. 3*b*.

The response is addressed to the originator (Alan); this address is pre-selected. The original selected text is included in field 50 and a comments history is provided in box 60. A response field 65 is also provided. The response can then be confirmed by selecting the OK button 70. Alternatively, the response can be cancelled (button 80). Users do not have to enter any text by way of response, but can simply click OK to confirm that they have read and agreed with the comment.

Referring to FIG. 3*c*, if a user modifies the selected text 500 without also clicking upon the comment 510 itself, the only part of the comment's status that is modified is its record of the selected text.

Figure 6B:
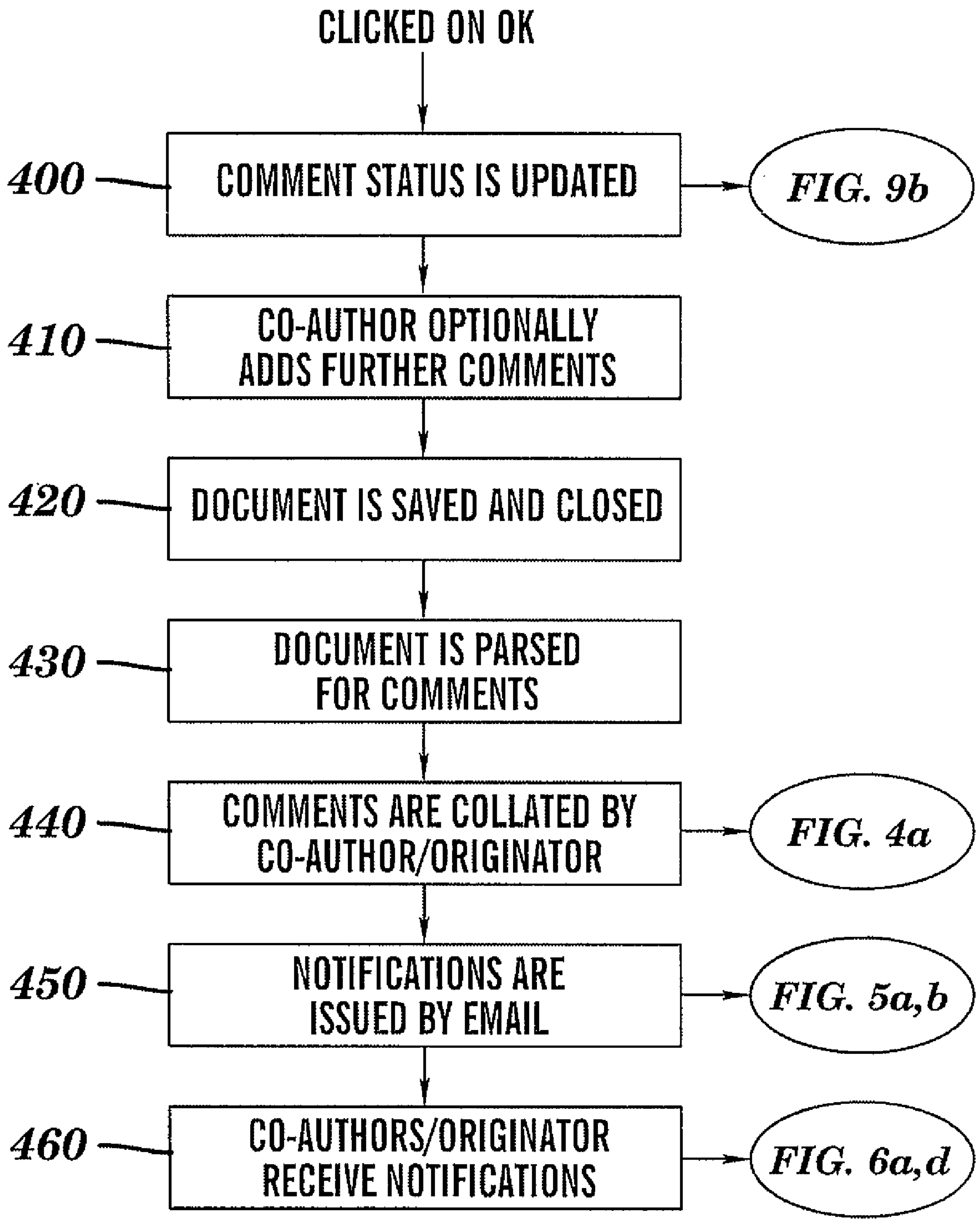
Figure 6C:
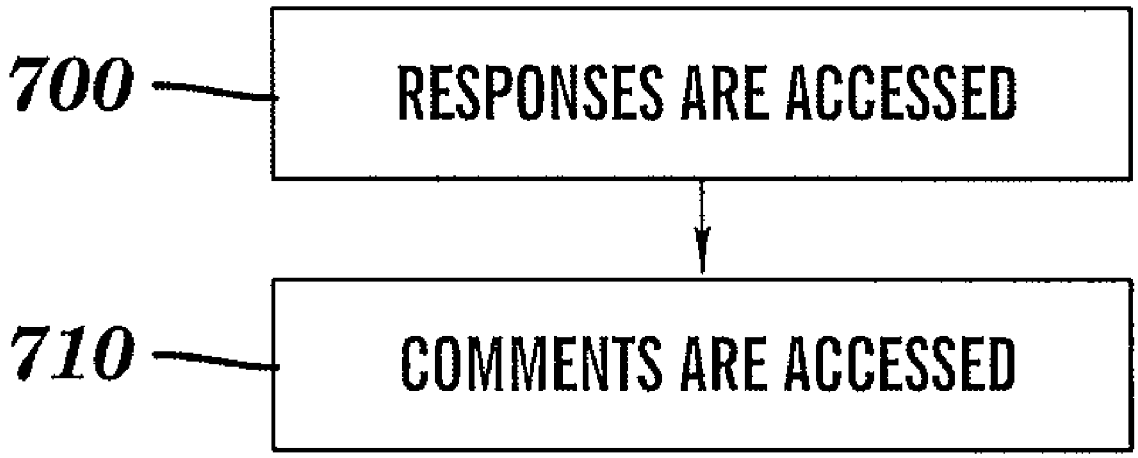
Figure 9B:
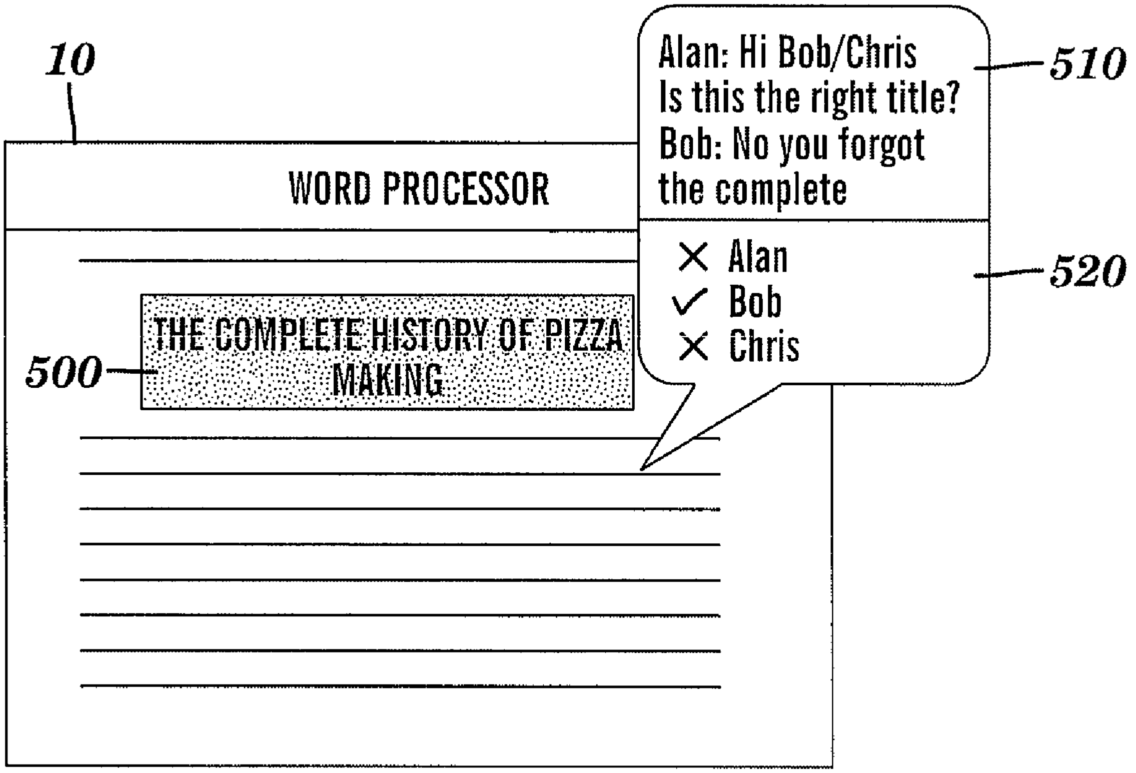
FIG. 9*b* provides an exemplary screenshot, in accordance with embodiments of the present invention.

The processing is continued with respect to FIG. 6*b*. When a response to a comment has been confirmed by the responding user clicking on OK (see FIG. 9*a*), the comment status is updated (step 400) via Status Updater 1020. As shown in FIG. 9*b*, the text 500 has been updated by Bob. Comment 510 shows Bob's response to Alan's original question. An action is now expected from Chris and Alan. There is nothing more for Bob to do now.

The co-author can optionally add further comments (step 410) and then the document is saved and closed (step 420). Once the document has been closed, it is parsed for responses to existing comments and any new comments using parser component 830 (step 430). New comments and those including new responses are collated by co-author/originator using collator 940 (step 440). Notifications are then issued by email to the appropriate people using notifier 850 (step 450) and received at step 460 (Notification Receiver 1000). An example of the notification received by the comment originator including any responses is shown in FIG. 6*d*. Responses and comments are then accessed (steps 700 and 710) using the components shown in FIG. 8*b*.

Processing continues in this manner. Thus Alan may choose to respond to Bob using a dialogue box such as that shown in FIG. 9*a*. This time Bob's name is preselected for notification and the comments history has of course been updated to include Bob's response. Any response by Alan to Bob will again result in an updated comment 510 in FIG. 9*b* which will indicate that an action is now with Bob (and Chris if he still has not replied).

When the co-authors have no more to add to a particular comment they can update the status associated with their names to indicate that an action is no longer expected. They can do this by simply clicking on a comment 510 to trigger the dialogue box in FIG. 9*a*, optionally entering some text in field 65, and then clicking on the OK button 70. Alan as the originator of the comment can choose to accept text with or without waiting for each co-author to concur.

The processing with respect to comments and responses will be more easily understood with reference to FIGS. 7*a* to 7*e*.

The figures illustrate how a comment 510 and status information 520, as illustrated in FIG. 3*c* for example, are rendered within the document as XML markup.

STEP 1

From FIG. 7*a*, it can be seen that Alan has created a comment. He has not yet however saved and closed the document. Each comment is assigned a unique id, has an associated originator (i.e. Alan) and has associated status information. The status information indicates whether a person needs to be notified and whether an action is pending as a result of any such notification. In this example, Alan is the notifier and so there is no need to notify him at present, nor is a response expected from him.

The markup further includes the selected text (e.g. "The History of Pizza Making") and an associated sub-comment (e.g. Hi Bob/Chris Is this the right title?) The text author of each sub-comment is indicated. Associated with the overall comment is a list of target co-authors (people to whom Alan's comment is addressed). Again, against each target co-author is the target's name, whether they are to be notified on this iteration and whether an action is pending from them. These last two attributes are preferable because a person may have been notified but may not yet have done any work in response to the notification.

STEP 2

When Alan saves and closes the document, comment parser 830 extracts comments for anybody whose notify attribute is set to true. The notify attribute is then changed within the document to false once the relevant party has been notified (or at least once comments have been extracted for notification). Otherwise people would be repeatedly notified of any comments targeted at them every time the document was saved and closed, regardless of whether any changes have been made to the comment. The markup thus now reads as shown in FIG. 7*b*. Note, changes between FIGS. 7*a* to 7*e* are highlighted.

STEP 3

When co-author Bob opens the document, the document is parsed and any comments for which the current editor of the document matches a target co-author name attribute, AND for which the corresponding actionPending attribute is true, are presented in a list at the head of the document. Thus, in one embodiment, assuming that Bob does not link directly from his notification to a comment in the document (although a list could still be presented at the head even in this case). These are the comments that require the coauthor's attention.

When the co-author selects one of the comments to respond to, he or she will see the dialogue box shown in FIG.

9*a*. The comment originator's name (Alan in this case) will be automatically preselected for notification. The originator's name preferably cannot be deselected. Optionally Bob may select any of the other co-author names for notification as well.

After Bob has edited the comment, but before Bob has saved and closed the document, the corresponding markup looks as shown in FIG. 7*c*. The response tag markup indicates Bob's response to Alan's comment. Alan's notify attribute is set to true to ensure that Alan is notified of Bob's response and Alan's actionPending attribute is also set to true. This is so that comment 510 appropriately indicates that Alan's work is not yet done (indicated by updating Alan's name to be associated with an x). Bob is no longer expected to do anything and his actionPending attribute is updated appropriately.

STEP 4

When Bob saves and closes the document, the notifier notifies anybody for whom the corresponding notify attribute is true (in the case of FIG. 7*c*, this is Alan), which is changed to false after the notification is performed. The contents of the response field are then also moved into the commentText field. This information is used to form a comments history. The text author for each sub-comment in the comments history is indicated. The markup for all of this is shown in FIG. 7*d*.

When Alan next opens the document the comments are parsed and any comments for which the current editor of the document matches the originator name attribute, AND for which any of the actionPending attributes are true (regardless of whether they are associated with the originator or one of the co-authors), are presented in a list at the head of the document. These are the comments created by the originator that still require someone's attention. (Preferably this will be done in conjunction with STEP 3 so that the editor will also see any comments generated by one or more of his co-authors which are also targeted at him.)

STEP 5

If Alan is now happy that he has had sufficient input from Bob, he updates the comment to indicate this. The markup will look as shown in FIG. 7*e*. In other words the actionPending attribute for Alan will now be false. The comment is still pending however because Chris' actionPending attribute is still set to true. Alan could of course choose to close off the comment altogether using comment closer component 1070.

If Alan wants to converse further with Bob, then Alan creates a response to Bob's text. That response is held within response tags and Bob's notify attribute and actionPending attribute are both set to true. When Alan saves and closes the document, Bob is notified of Alan's response. Subsequently the response is moved into the commentText field to form part of the comments history.

Thus the markup held for each comment can be used by various components of the system to parse and render comments and to notify somebody appropriately.

To summarize, the "notify" attribute is used by parser component 830 to determine who is to be notified about a particular comment. The actionPending attribute is used by the comment displayer 860 and status component 870 to determine and display information indicating from whom information is still required. For example, in FIG. 9*b*, Alan and Chris have more work to do (indicated by the x against each of their names). The selectedText field is used to include the selected text in the 'create new comment' and 'respond to comment' dialogue boxes. The commentText field is used by the 'respond to comment' dialogue box to provide a comments history.

It is also possible to delete comments using a delete component (not shown). In one embodiment, only the originator can do this. In another embodiment, anybody is permitted to delete a comment. When a comment is deleted, all actions pending on a comment are lost. If another co-author opens the document via a comment link, then the another co-author receives an error message saying that the comment cannot be found and they are taken to the head of the document. On the other hand, if a co-author opens the document directly, the deleted comment is not listed among the comments requiring that author's attention.

Note that it may be possible to view a complete list of comments and responses for any portion of a document and to cycle through these comments and responses to such comments.

Although the invention has been described in terms of comments, the invention is not limited to comments. Instead of, or in addition to, parsing a document for comments, the parser component may create a list of document updates for each co-author. The updater would, of course, need to indicate who the updates are for and the parser component would use such information to collate updates. Each associated portion of the document could have historical update information associated with it.

Note that in the embodiment in which comments are associated with document portions, those comments may be embedded as part of the document, but equally they may be stored separately in a storage medium apart from the document. In the case where they are stored separately in a storage medium, the parser component parses the storage medium containing the comments as opposed to parsing the document itself. When the comments are stored separately, a link of each stored comment to its associated document portion is also stored in the storage medium.

The embodiments have been described in terms of a predefined notification method (email). However the invention is not limited to such. Co-authors may, for example, be able to specify their preferred notification method (email, instant message etc.) By way of another example, a comment originator may be able to select the notification method on a per comment basis, perhaps choosing to send more urgent comments by instant messaging and less urgent comments by email.

Figure 8A:
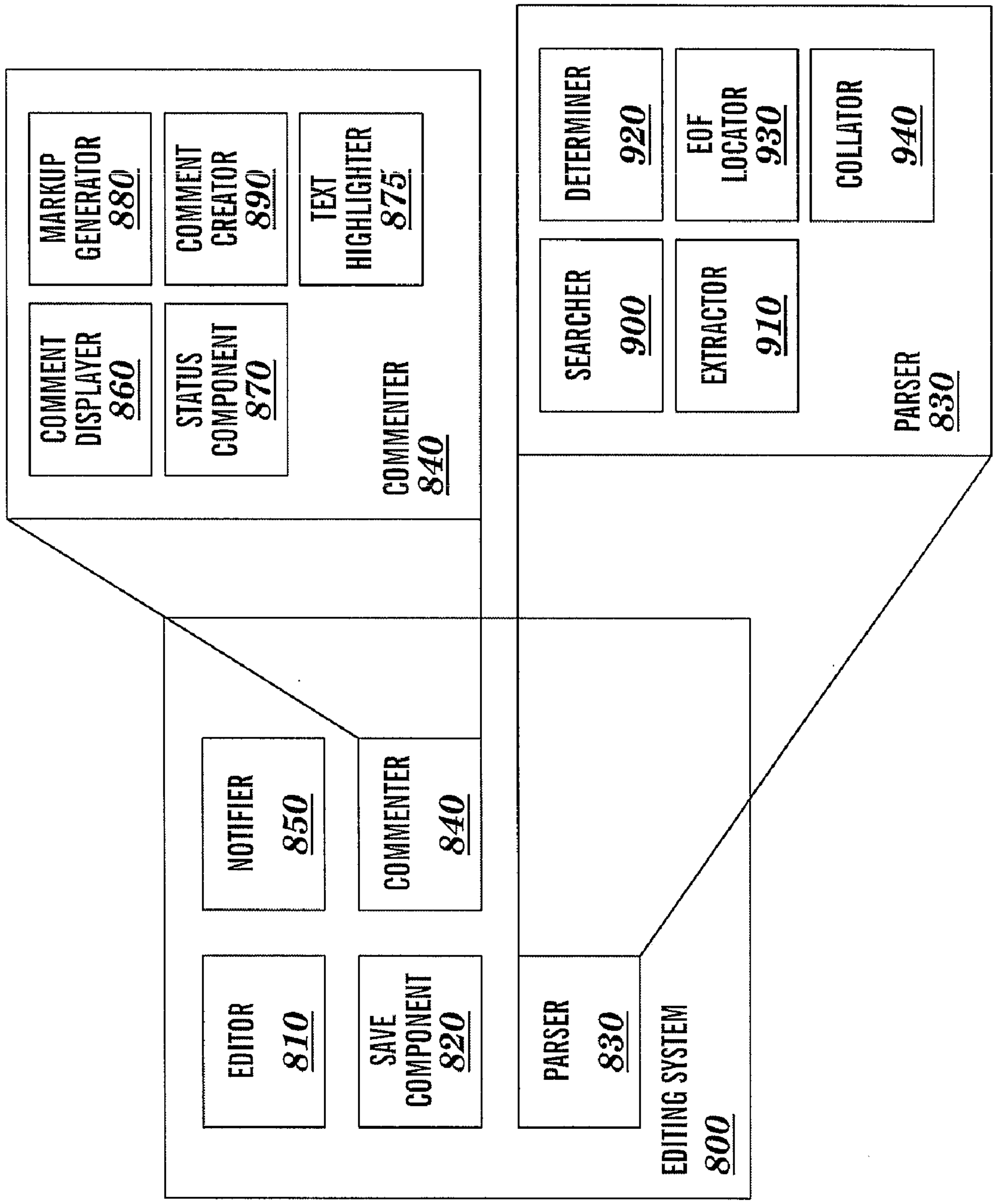
FIGS. 8*a* and 8*b* depict the componentry of the present invention in accordance with embodiments of the present invention.
Figure 8B:
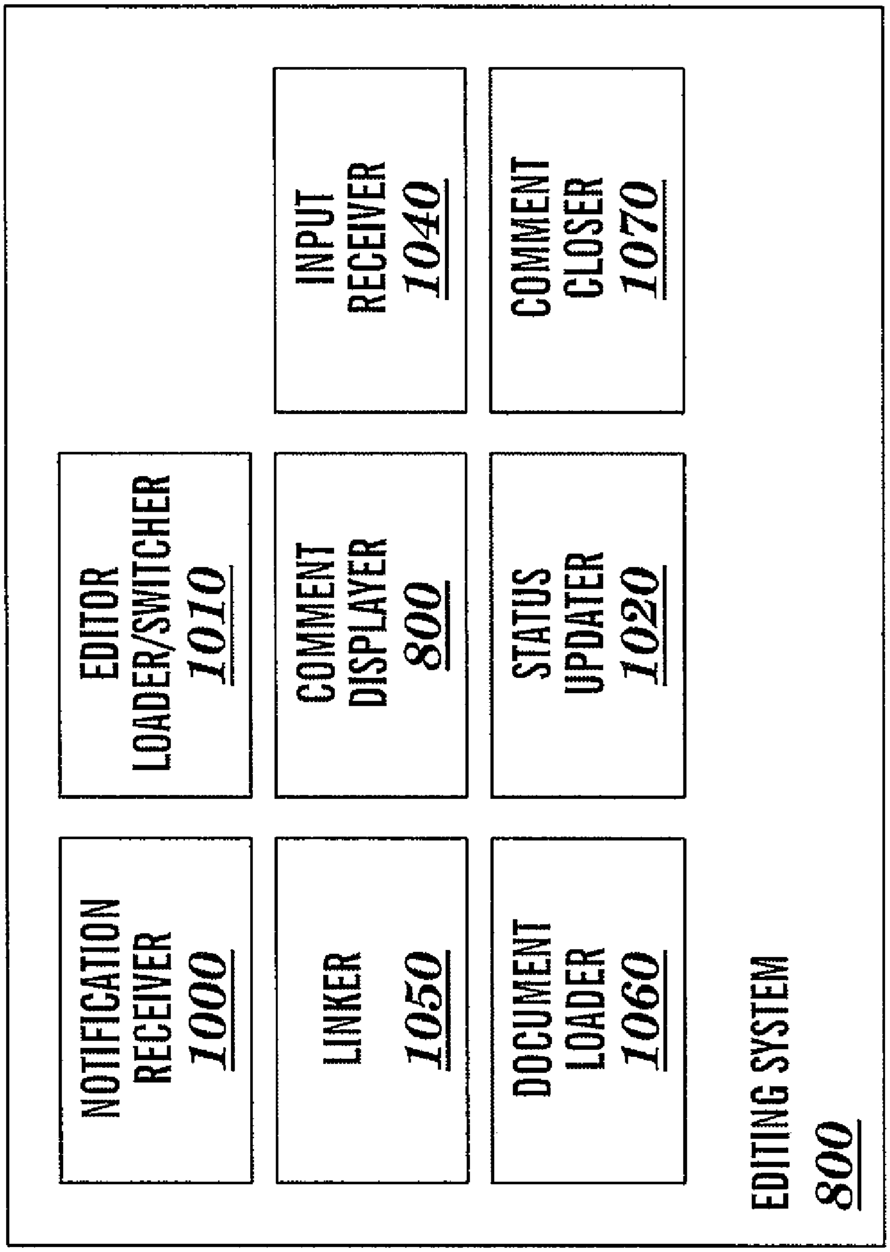

It will be appreciated that while FIGS. 8*a* and 8*b* illustrate a separate component for performing each processing step of the present invention, in practice some of these components may comprise methods/functions of a smaller number of larger components.

The invention has been described in terms of notifications being batched up and sent out to targeted co-authors. In another embodiment, the onus is upon each co-author to open a document periodically to see whether any comments are available for them. Comments for the current editor of the document are batched up and listed at the head of the document. A comment originator may further have the option to decide whether to notify someone or not. This could be achieved by having a notification checkbox next to each coauthor's name in the Create New Comment and Respond to Comment dialogue boxes. Checking this checkbox would set notify=true for that co-author; otherwise notify=false.

In another embodiment, upon closing the document, the comment originator could be given the choice whether to have the notifications issued or not. This would allow the user to edit the document in several separate sessions and defer the issuing of notifications until the closing of the document on the final session.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for collaborative editing of a document by an author of the document and a plurality of reviewers, said method being performed by program code executing on a computer, said method comprising:

receiving, by the program code from the author, an identification of a plurality of selected portions of the document;

receiving, by the program code from the author, a plurality of comments created by the author and an identification of at least one reviewer of the plurality of reviewers to which each received comment is directed, wherein the selected portions and the comments are associated with each other on a one-to-one basis, and wherein each comment pertains to content of the selected portion that each comment is associated with;

parsing the received comments, and utilizing the received identification of the at least one reviewer to which each comment is directed, to generate a list of comments comprising the plurality of comments, wherein the list of comments specifies for each comment the at least one reviewer to which each comment is directed, and wherein said parsing and said utilizing are performed by the program code; and making available, by the program code to each reviewer, the comments on the list of comments directed to each reviewer, wherein the method further comprises for each selected portion of the document: providing, by the program code to the author, a corresponding displayed form;

wherein each displayed form includes the selected portion and space for the author to specify both the comment associated with the selected portion and the identification of at the least one reviewer to which the associated comment is directed; and wherein said receiving the plurality of comments comprises receiving the comments in the displayed forms corresponding to the selected portions of the document.

2. The method of claim 1, wherein during said receiving the identification of the plurality of selected portions of the document, the selected portions of the document are identified by being highlighted.

3. The method of claim 1, wherein the received comments are stored as part of the document, and wherein said parsing comprises parsing the document to generate the list of comments.

4. The method of claim 1, wherein the received comments and links to their associated portion of the document are stored in a storage medium apart of the document, and wherein said parsing comprises parsing the storage medium to generate the list of comments.

5. The method of claim 1, wherein said making available comprises sending notification to each reviewer that the comments directed to each reviewer are available.

6. The method of claim 5, wherein said sending notification comprises sending notification to each reviewer by email.

7. The method of claim 5, wherein said sending notification comprises sending notification to each reviewer by instant messaging.

8. The method of claim 5, wherein each comment is classified as more urgent or less urgent such that a first comment is classified as more urgent and a second comment is classified as less urgent, wherein said sending notification comprises sending notification to each reviewer by a first notification method for each comment classified as more urgent and by a second notification method for each comment classified as less urgent, and wherein the second notification method differs from the first notification method.

9. The method of claim 8, wherein the first notification method is an instant messaging notification method, and wherein the second notification method is an email notification method.

10. The method of claim 5, wherein the notification to a first reviewer of the plurality of reviewers comprises a link to the document.

11. The method of claim 10, wherein the notification to the first reviewer further comprises each comment directed to the first reviewer and the portion of the document associated with each comment directed to the first reviewer.

12. The method of claim 11, wherein the notification to the first reviewer further comprises a link to each comment directed to the first reviewer.

13. The method of claim 1, wherein said making available comprises:

batching up the comments on the list of comments directed to each reviewer and listing the batched up comments at the head of the document, and making the document available to each reviewer to enable each reviewer to periodically check the documents for comments directed to each reviewer.

14. The method of claim 1, wherein the plurality of selected portions of the document comprise a diagram or a spreadsheet.

15. The method of claim 1, wherein a first comment of the plurality of comments is directed to at least two reviewers of the plurality of reviewers.

16. The method of claim 1, wherein the method further comprises receiving, by the program code from the author, a directive to delete a first comment of the plurality of comments, said first comment having been directed to a first reviewer of the plurality of reviewers.

17. The method of claim 1, wherein the method further comprises receiving, by the program code from a first reviewer of the plurality of reviewers, a directive to delete a first comment of the plurality of comments, said first comment having been directed to the first reviewer.

18. The method of claim 1, wherein the method further comprises:

after said making available, receiving by the program code a response from a first reviewer of the plurality of reviewers to a first comment directed to the first reviewer; and notifying the author of the response to the first comment.

19. The method of claim 18, wherein the response to the first comment comprises a modification by the first reviewer of the portion of the document associated with the first comment.

20. The method of claim 18, wherein the response to the first comment comprises a further comment by the first reviewer, and wherein the further comment pertains to content of the first comment.

21. A computer system comprising a computer and a computer readable memory unit, said memory unit containing program code that when executed by the computer performs the method of claim 1.

22. A computer program product, comprising a computer readable memory unit having program code that when executed on a computer performs the method of claim 1.

23. A method for collaborative editing of a document by an author of the document and a plurality of reviewers, said method being performed by program code executing on a computer, said method comprising:

receiving, by the program code from the author, an identification of a plurality of selected portions of the document;

receiving, by the program code from the author, a plurality of comments created by the author and an identification of at least one reviewer of the plurality of reviewers to which each received comment is directed, wherein the selected portions and the comments are associated with each other on a one-to-one basis, and wherein each comment pertains to content of the selected portion that each comment is associated with;

parsing the received comments, and utilizing the received identification of the at least one reviewer to which each comment is directed, to generate a list of comments comprising the plurality of comments, wherein the list of comments specifies for each comment the at least one reviewer to which each comment is directed, and wherein said parsing and said utilizing are performed by the program code; and making available, by the program code to each reviewer, the comments on the list of comments directed to each reviewer, wherein the list of comments is a table of comments, wherein the table comprises multiple rows and multiple columns, wherein the multiple rows comprise a title row and a plurality of additional rows, wherein the multiple columns comprise a title column and a plurality of additional columns, wherein the title row in the title column comprises text denoting that the additional rows in the title column each comprise a comment of the plurality of comments, wherein each additional row comprises a unique comment of the plurality of comments, wherein each additional column in the title row identifies a unique reviewer of the plurality of reviewers, wherein each cell representing an intersection of a respective row of the additional rows and a respective column of the additional columns comprises either:

a first symbol denoting that the unique comment associated with the respective row is not directed to the unique reviewer associated with the respective column; or a second symbol denoting that the unique comment associated with the respective row is directed to the unique reviewer associated with the respective column, and wherein a first additional row and a second additional row of the additional rows in one column of the additional columns respectively comprise the first symbol and the second symbol.

24. The method of claim 23, wherein the table consists of the multiple rows and the multiple columns, wherein the multiple rows consist of the title row and the plurality of additional rows, and wherein the multiple columns consist of the title column and the plurality of additional columns.

* * * * *